(12) United States Patent
Henderson (10) Patent No.: US 6,557,019 B1
(45) Date of Patent: Apr. 29, 2003

(54) APPARATUS AND METHOD FOR COMPACT HAAR TRANSFORM

(75) Inventor: David L. Henderson, Austin, TX (US)

(73) Assignee: Spectral Logic Design, Austin, TX (US)

(*) Notice: Subject to any disclaimer, the term of this patent is extended or adjusted under 35 U.S.C. 154(b) by 0 days.

(21) Appl. No.: 09/390,899

(22) Filed: Sep. 7, 1999

(51) Int. Cl.[7] .............................................. G06F 17/14

(52) U.S. Cl. ...................................................... 708/400

(58) Field of Search ................................ 708/400, 401; 382/232, 240, 248

(56) References Cited

U.S. PATENT DOCUMENTS

| | | | | |
|---|---|---|---|---|
| 4,224,678 A | * | 9/1980 | Lynch et al. ................ | 708/203 |
| 6,177,894 B1 | * | 1/2001 | Yamaguchi ................. | 341/120 |
| 6,236,761 B1 | * | 5/2001 | Marchand .................. | 382/248 |

OTHER PUBLICATIONS

A 200 MHz Quadrature Digital Synthesizer/Mixer in 0.8$\mu$m CMOS, Loke Kun Tan and Henry Samueli, IEEE Journal of Solid State Circuits, vol. 30, No. 3, Mar, 1995.

* cited by examiner

Primary Examiner—Chuong Dinh Ngo
(74) Attorney, Agent, or Firm—Richard K. Huffman; James W. Huffman

(57) ABSTRACT

An apparatus and method are provided for performing both forward and inverse Haar transforms of a sequence of n-bit data samples. The forward Haar transform apparatus has sum-and-truncate logic and a plurality of coefficient generators. The sum-and-truncate logic generates a plurality of n-bit intermediate terms. The plurality of coefficient generators is coupled to the sum-and-truncate logic. The plurality of coefficient generators generate a plurality of n+1-bit spectral coefficients. The inverse Haar transform apparatus has index signal and inverse transform logic. The index signal indicates a specific n-bit sample, the specific n-bit sample being one of a sequence of n-bit samples corresponding to the Haar transform. The inverse transform logic is coupled to the index signal. The inverse transform logic computes the specific n-bit sample, where the specific n-bit sample is derived from selected n+1-bit spectral coefficients.

22 Claims, 8 Drawing Sheets

APPARATUS AND METHOD FOR COMPACT HAAR TRANSFORM

CROSS-REFERENCE TO RELATED APPLICATIONS

This application is related to co-pending U.S. Pat. application Ser. No. 09/390,900 entitled Apparatus and Method for Direct Digital Frequency Synthesis, having a common assignee, common inventors, and filed on Sep.7, 1999. The aforementioned co-pending application is hereby incorporated by reference in its entirety for all purposes.

BACKGROUND OF THE INVENTION

1. Field of the Invention

This invention relates in general to the field of electronic circuit devices, and more particularly to an apparatus and method for performing both forward and inverse compact Haar Transforms.

2. Description of the Related Art

The characteristics and behavior of electronic signals can be expressed in a number of different ways, but perhaps the most common way of representing a signal is by plotting its amplitude as a function of time, or as a function of distance from a point, or as a function of some other variable relevant to the signal. Mathematically speaking, the domain of the signal corresponds to the relevant variable, say, time. The range of the signal corresponds to its amplitude. Consequently, signals are classified according to their domain. For example, a signal having time as its domain is known as a time domain signal.

The expression and manipulation of signals in the time domain are performed every day in virtually every electronic product. This is because real events affecting most electronic products occur in real time. Radio signals are modulated by electronic modulators in real-time, modulated signals are transmitted in real time, transmitted signals are received and demodulated in real time, demodulated signals are converted by electronic transducers into audio tones in real time, and audio tones are heard by listeners in real time.

Time domain signals are useful and familiar, but many applications, specifically applications that handle or manipulate lots of data, can be better served by transforming a time domain signal into another form, that is, representing the signal within another domain. For example, some operations or computations by an electronic product may require less logic or may be performed much faster on signals that have been transformed into another domain. More specifically, a signal in an original domain, say time, is first transformed into a representation of the signal in a transform domain, say frequency. Next, desired operations or computations are performed on the frequency domain signal to produce a frequency domain output. Finally, an inverse transformation is performed on the frequency domain output to yield a time domain output.

The Fourier transform is perhaps the most well-known transform that is used within electronic products for purposes described above. Executing a Fourier transform on a time domain signal so that it is represented in the frequency domain immediately provides two benefits that cannot easily be achieved in the time domain: 1) the frequency characteristics of the signal, that is, which frequencies are stronger and which are weaker, can be clearly observed from a frequency domain plot of the signal; and 2) convolution of the signal with another signal to produce a result becomes a simple multiplication operation. In the first case for example, it is difficult to determine from a time domain representation of a 25 Hz sinusoidal waveform that its fundamental frequency is 25 Hz. Yet, after transformation to the frequency domain, the 25-Hz fundamental frequency is immediately apparent. In the second case, passing a time domain signal through a low pass filter produces an output signal. But to determine the structure of the output signal requires that a convolution integral be computed using the time domain signal and the impulse response of the low pass filter. A convolution calculation is a very tedious and complex process. Yet, the filter output can more easily be determined by multiplying the Fourier transform of the input signal by the Fourier transform of the filter impulse response, and then performing an inverse transform on the result of the multiplication.

There are many other types of transforms used in electronic products today. Typically, a specific transform is used for a specific application because it provides certain benefits such as speed, observation of some signal parameter, or reduction in logic. One particular transform that provides both logic reduction benefits as well as computational ease is the Haar transform. A class of signals, smooth signals, require less logic within an electronic device to store and manipulate when they are represented in the Haar domain as opposed to their original domain. Effectively, less bits are required to store a Haar domain parameters than would be required to store signal parameters in the original domain, thus compressing the signal data.

That data compression is achieved for smooth signals using Haar transform techniques is not inconsequential because reduction in the logic required to store signal parameters in electronic devices directly reduces the amount of power required to operate the devices. In addition, logic reduction typically reduces the cost of a product because it uses less components. This is very important when one considers the vast number of hand-held and portable products in use today because these devices are powered by batteries. Consequently, reducing the number of logic cells within a portable device means that it can operate longer, or that a smaller battery can be used to achieve equivalent operating time.

But the Haar transform is not used in many applications where data compression can be achieved because the number of bits that are required to express a signal in the Haar domain increases in proportion to the number of data samples that are transformed from the original domain to the Haar domain. More specifically, for a sequence of 256 samples of a signal where each of the samples requires 10 bits to express in the original domain requires 18-bit registers to compute the 256 Haar parameters needed to express the signal in the Haar domain. Once the signal is transformed into the Haar domain, if it is sufficiently smooth, one finds that most of the Haar parameters that result have zeros in most of the bit positions of the parameter registers. But in order to compute the parameters in the first place, 18-bit registers are required.

In general, the number of bits required to compute Haar parameters is equal to the base 2 log of the number of input samples plus the number of bits required to express each of the input samples. For M n-bit data samples, computation of corresponding Haar parameters requires registers that are $\log_2 M + n$ bits wide. In the case of 1,024 10-bit samples, the register size required to compute corresponding Haar parameters is twice the size of that required to store the original samples.

Therefore, what is needed is a forward Haar transform apparatus that does not require an excessive number of bits for computation of Haar parameters corresponding to an input sequence of data samples.

In addition, what is needed is an inverse Haar transform apparatus that can perform an inverse Haar transform on a set of bit-limited Haar parameters to produce an output in the original domain.

Furthermore, what is need is a method for performing forward and inverse Haar transforms on a sequence of n-bit data samples, where calculation of the corresponding Haar parameters requires at most n+1-bit registers.

SUMMARY OF THE INVENTION

To address the above-detailed deficiencies, it is an object of the present invention to provide a forward Haar transform apparatus that requires at most n+1-bit registers to compute Haar parameters corresponding to an input sequence of n-bit data samples. Accordingly, in the attainment of the aforementioned object, it is a feature of the present invention to provide a compact Haar transform apparatus, for executing a spectral transformation corresponding to a sequence of n-bit samples. The compact Haar transform apparatus includes sum-and-truncate logic and a plurality of coefficient generators. The sum-and-truncate logic generates a plurality of n-bit intermediate terms where the sum-and-truncate logic truncates the least significant bit of a generated n+1-bit sum to form an associated n-bit intermediate term. The a plurality of coefficient generators is coupled to the sum-and-truncate logic. The plurality of coefficient generators generates a plurality of n+1-bit spectral coefficients, where the associated n-bit intermediate term corresponds to one of the plurality of n+1-bit spectral coefficients. The one of the plurality of n+1-bit spectral coefficients indicates whether the generated n+1-bit sum was even or odd. The generated n+1-bit sum is restored by adding the least significant bit of said the of the plurality of n+1-bit spectral coefficients to the associated n-bit intermediate term.

An advantage of the present invention is that the number of logic cells required to implement a forward Haar transform is much less than what has heretofore been provided.

Another object of the present invention is to provide an inverse Haar transform apparatus that can perform an inverse Haar transform on a set of n+1-bit Haar parameters to produce an output in the original domain consisting of n-bit data samples.

In another aspect, it is a feature of the present invention to provide an apparatus for executing a compact Haar transform. The apparatus has an index signal and inverse transform logic. The index signal indicates a specific n-bit sample. The specific n-bit sample is one of a sequence of n-bit samples corresponding to the compact Haar transform. The inverse transform logic is coupled to the index signal, and computes the specific n-bit sample. The specific n-bit sample is derived from selected n+l-bit spectral coefficients. The inverse transform logic includes a rank decoder, coefficient negation logic, and LSB restoral logic. The rank decoder decodes the index signal to provide one of the selected n+1-bit spectral coefficients, where the one of said selected n+l-bit spectral coefficients corresponds to a compact Haar spectral rank, and where the rank decoder includes a read only memory (ROM). The coefficient negation logic is coupled to the rank decoder. The coefficient negation logic negates the one of the selected n+1-bit spectral coefficients based upon the state of a bit of the index signal, where the state of the bit of the index signal indicates whether a Haar basis function corresponding to the one of the selected n+1-bit spectral coefficients is positive or negative. The LSB restoral logic is coupled to the rank decoder. The LSB restoral logic adds a least significant bit of the one of the selected n+1-bit spectral coefficients into an n-bit sample computation, where the n-bit sample computation is required to compute the n-bit sample.

Another advantage of the present invention is that a set of common logic devices can be used to compute an inverse Haar transform because all of the Haar coefficients are within one bit of the width of an output sample.

In a further aspect, it is a feature of the present invention to provide a computer program product for use in designing, simulating, fabricating, or testing a compact Haar transform circuit. The computer program product has a storage medium. The storage medium, has computer readable instructions embodied thereon, for causing a computer upon which the computer readable instructions are executed to describe the compact Haar transform circuit such that it can be modified, simulated, fabricated, or tested. The computer readable instructions include first instructions. The first instructions cause the computer to describe inverse Haar transform logic. The inverse Haar transform logic is configured to compute n-bit samples, where each of the n-bit samples is derived from n+1-bit spectral coefficients. The inverse transform logic has a rank decoder, a coefficient negator, and LSB restoral logic. The rank decoder receives an index signal from a source thereof, and provides one of the n+1-bit spectral coefficients, the one of the n+1-bit spectral coefficients corresponding to a rank of a compact Haar spectrum. The coefficient negator is coupled to the rank decoder, and negates the one of the n+l-bit spectral coefficients based upon the state of a bit of the index signal. The LSB restoral logic is coupled to the rank decoder. The LSB restoral logic adds a least significant bit of the one of the n+1-bit spectral coefficients into an n-bit sample computation, where the n-bit sample computation is required to generate a particular n-bit sample.

A further advantage of the present invention is that less power is required to operate an electronic device that employs the compact Haar transform technique.

Yet another object of the present invention is to provide a method for performing forward and inverse Haar transforms on a sequence of n-bit data samples, where calculation of the corresponding Haar parameters requires at most n+1-bit registers.

In yet a further aspect, it is a feature of the present invention to provide a method for executing an inverse compact Haar transform. The method includes decoding an index to select n+1-bit spectral coefficients, the n+1-bit spectral coefficients being required to compute a specific n-bit data sample; negating those n+1-bit spectral coefficients whose corresponding Haar basis function is negative for the index provided by the decoding; computing a sum of the negated n+1-bit spectral coefficients with the selected n+1-bit spectral coefficients which are not negated by the negating; and adding the least significant bits of all of the selected n+l-bit spectral coefficients to the sum produced by the computing.

Yet a further advantage of the present invention is that less complex logic devices can be employed within electronic products to perform forward and inverse Haar transformations.

BRIEF DESCRIPTION OF THE DRAWINGS

These and other objects, features, and advantages of the present invention will become better understood with regard to the following description, and accompanying drawings where.

DETAILED DESCRIPTION

In light of the above background on present day techniques for computing the Haar transform of a sequence of data samples, several examples will now be discussed with reference to FIGS. 1 through 3. These examples illustrate the problematic nature of present day Haar transform techniques, particularly when such techniques are embodied as electronic circuits within mobile or portable products that rely upon batteries to operate. Following this discussion, a detailed description of the present invention will be provided with reference to FIGS. 3 through 8. The present invention provides both forward and inverse compact Haar transform apparatus and methods that retain the desirable characteristics of Haar transform techniques, yet result in embodiments that are smaller, less complex, more reliable, and requires less power to operate than those which are presently available.

Figure 1:
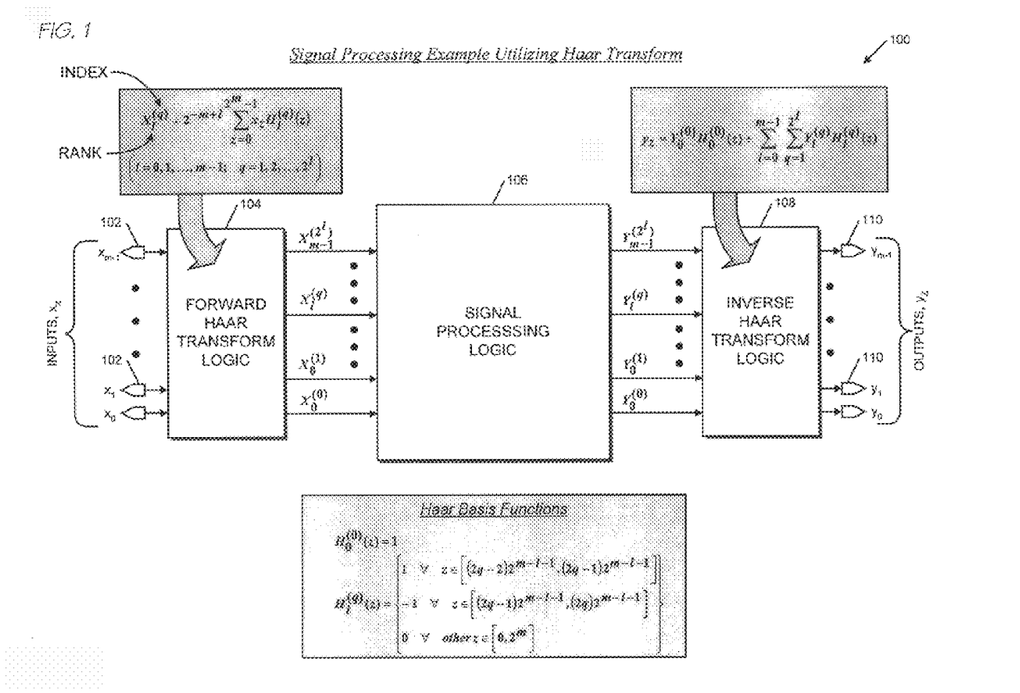
FIG. 1 is a block diagram illustrating how present day Haar transform techniques are employed in a signal processing application.

Referring to FIG. 1, a block diagram 100 is presented illustrating how present day Haar transform techniques are employed in a typical signal processing application. The block diagram depicts a number of data sample inputs 102 that provide a sequence of data samples, $x_z$, to forward Haar transform logic 104. The forward Haar transform logic 104 transforms the sequence of data samples into a corresponding set of Haar spectral coefficients, $X_l^{(q)}$. The Haar spectral coefficients are routed to signal processing logic 106. The signal processing logic 106 manipulates the Haar spectral coefficients according to a prescribed algorithm to produce spectral outputs, $Y_l^{(q)}$. The spectral outputs are provided to inverse Haar transform logic 106, which translates the spectral outputs into output samples, $y_z$.

In operation, transform theory has been employed to solve mathematical problems ever since Jean Baptiste Joseph Fourier developed his transform techniques in the early 1800's. Transforming a sequence of data samples from one domain to another is beneficial for many types of applications. For example, performing a Fourier transform on a signal in the time domain enables one to readily discern frequency domain characteristics of the signal. Computational benefits can be obtained as well. In the case of the Fourier transform, convolution of two data sequences in one domain corresponds to multiplication of two corresponding sets of Fourier domain spectral coefficients. Hence, rather than convolving the two data sequences in the original domain, in many instances it is much easier to transform both sequences into the Fourier domain, multiply the two transformed sequences together, and then transform the result of the multiplication back into the original domain, thus yielding a convolution result. And since the convolution is the operation employed to compute the time domain response of a signal when applied to a linear time-invariant circuit, it becomes clear why the Fourier transform, and its discrete counterpart, the discrete Fourier transform (DFT), are ubiquitously employed within present day electronic devices.

The DFT is perhaps the most prevalent transform technique in the art, but since the introduction of digital logic devices, a host of other useful discrete transform techniques have been developed as well, with each specific transform technique being particularly advantageous for certain applications or circuit device embodiments. One such technique, the Haar transform, has proven to be very useful for performing signal processing operations on data samples taken from smooth signals. The Haar transform is used today primarily for imagery processing applications.

While the particular transform performed in FIG. 1 by the forward and inverse transform logic 104, 108 could easily be changed to represent any present day discrete transform technique, forward and inverse Haar transform functions are represented by the logic 104, 108 because of the relevance of Haar transform techniques to this application.

The present inventor has observed that the Haar transform is additionally advantageous for data compression applications. This is because, for data samples, $x_z$, taken from smooth signals, computation of the Haar spectral coefficients, $X_l^{(q)}$, is based upon localized behavior of the samples, that is, on the behavior of data samples that are close together. A smooth signal is a signal such as a sinusoid, exponential, logarithm, or inverse power function, whose amplitude changes smoothly, that is, the signal does not exhibit large amplitude discontinuities. For smooth signals, although the sum of adjacent amplitude samples may be large, the difference between adjacent data samples is very small. And because computation of the Haar spectral coefficients is based upon the differences between adjacent data samples, a high degree of data compression can be achieved for very smooth signals. Basically, it requires very few bits to represent a very small number, whereas many bits are required to represent a very large number.

Like most discrete signal transforms, the Haar spectral coefficients, $X_l^{(q)}$, that are computed correspond to a set of orthogonal Haar basis functions, $H_l^{(q)}(z)$, where, in the case of an input sequence, $x_z$, consisting of $2^m$ data samples, $$H_0^{(0)}(z)=1;$$

$$H_l^{(q)}(z) = \begin{cases} 1 & \forall z \in [(2q-2)2^{m-l-1}, (2q-1)2^{m-l-1}] \\ -1 & \forall z \in [(2q-1)2^{m-l-1}, (2q)2^{m-l-1}] \\ 0 & \forall \text{ other } z \in [0, 2^m] \end{cases};$$

$$(l=0,1,\ldots,m-1; q=1,2,\ldots,2^l).$$

where the subscript, l, is referred to as the rank of the basis function and the superscript, q, is referred to as the index of the basis function within a given rank.

Transformation of the sequence consisting of $2^m$ data samples into Haar spectral coefficients is accomplished according to the following relationship:

$$X_l^{(q)} = 2^{-m+l} \sum_{z=0}^{2^m-1} x_z H_l^{(q)}(z);$$

(l=0,1, . . . ,m−1; q=1,2, . . . , $2^l$).

Thus, for the sequence, $x_z$, a corresponding set of 2 m Haar spectral coefficients, $X_l^{(q)}$, are generated.

Yet, unlike many other discrete transform techniques, the above equations make apparent that the generation of Haar spectral coefficients involves computations on real numbers only. Contrast this with the operations on complex number that are required to compute discrete Fourier coefficients. Moreover, the Haar basis functions only take on the values of −1, 0, and 1, thus computation of a set of Haar spectral coefficients is achieved by adding and subtracting indexed samples from within the sequence of data samples.

That computation of Haar coefficients requires execution of simple arithmetic operations on real numbers is advantageous to digital circuit designers: rather than requiring complicated multiplier circuits capable of multiplying both real and complex components of a number, less complicated addition and subtraction logic can be utilized to realize the forward Haar transform.

Following forward transformation, the Haar spectral coefficients are provided to the signal processing logic 106 for execution of a prescribed signal processing task. The output of this signal processing task is typically a set of output Haar coefficients $Y_l^{(q)}$.

To transform the result of the signal processing task back into the original domain, the inverse Haar transform logic 108 computes a sequence of output samples, $y_z$, in accordance with the following:

$$y_z = Y_0^{(0)} H_0^{(0)}(z) + \sum_{l=0}^{m-1} \sum_{q=1}^{2^l} Y_l^{(q)} H_l^{(q)}(z)$$

Because of the characteristics of the Haar basis functions, computation of the set of output samples involves only the addition and subtraction of real numbers.

An in-depth discussion of Haar Transform theory and its corresponding utility is beyond the scope of this application. A comprehensive presentation of Haar transform theory within the context of digital circuit design can be found in *Finite Orthogonal Series in the Design of Digital Devices*, M. G. Karpovsky, 1976, John Wiley & Sons, Inc.: New York, ISBN 0-470-15015-7.

For data compression applications of the Haar transform, it is noted that the flow of signals shown in FIG. 1 need not necessarily occur in real time. For instance, an off-line device may perform the operations corresponding to the forward Haar transform logic 104. The device will read in the series of sample inputs 102, $x_z$, and transform them into a corresponding set of Haar spectral coefficients, $X_l^{(q)}$, thereby achieving a high degree of compression. Then, the compressed data is downloaded to another electronic device whose function is to perform the operations corresponding to the signal processing logic 106 and the inverse Haar transform logic 108. Thus, the off-line device performs the data compression function, with the advantage being that the device to which the data is downloaded requires only storage and processing logic commensurate with the compressed data-quite a savings in logic, power, and complexity in many cases. One such case where savings result from performing the forward Haar transformation via logic 104 that is physically separate from signal processing logic 106 and inverse logic 108 is more specifically described with reference to FIG. 2.

Figure 2:
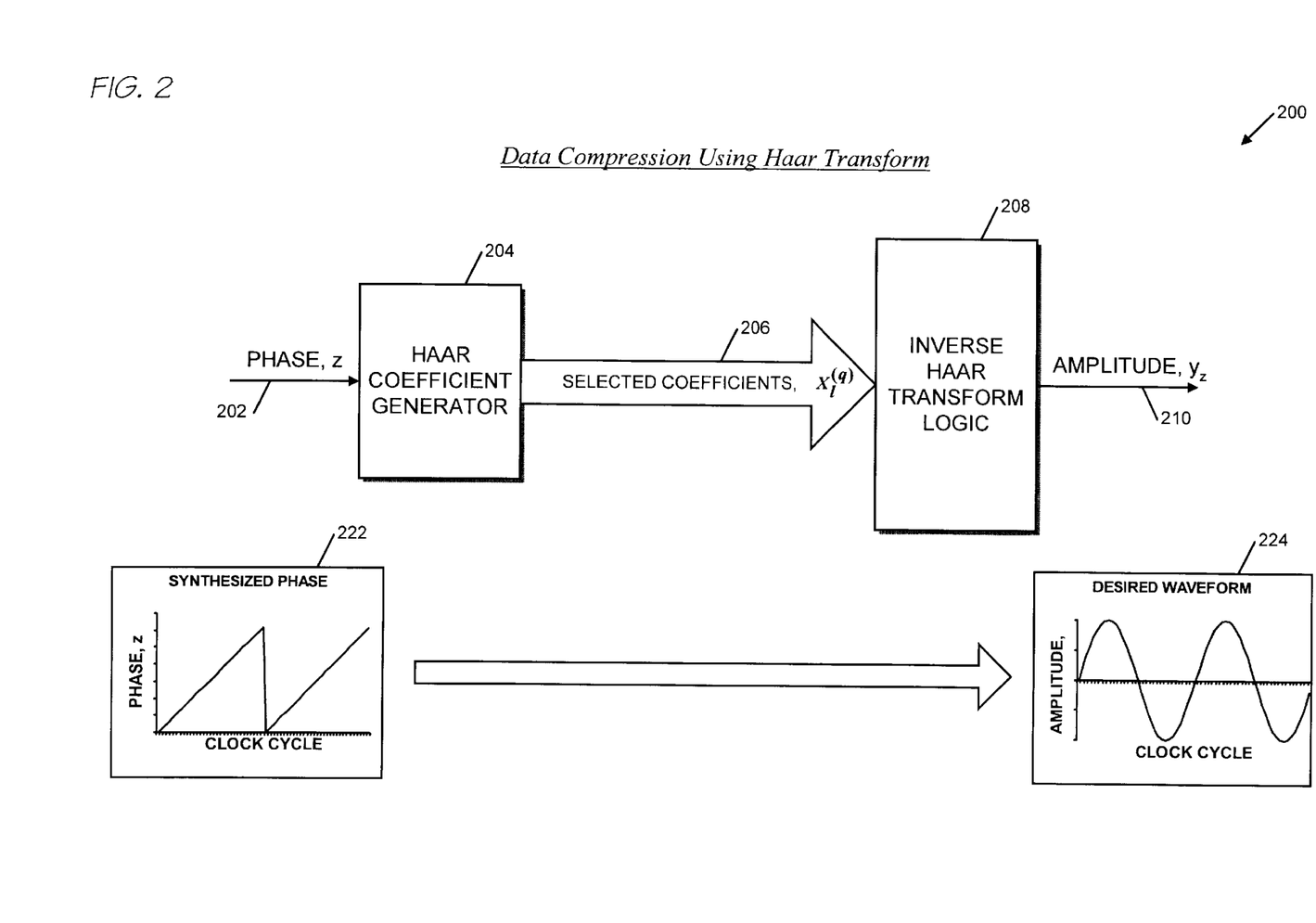
FIG. 2 is a block diagram illustrating employment of Haar transform techniques to realize data compression benefits.

Referring to FIG. 2, block diagram 200 is presented illustrating an example of how Haar transform techniques are employed to realize data compression benefits in electronic circuit devices. The block diagram 200 depicts a phase input 202, PHASE, that is provided to a Haar coefficient generator 204. The Haar coefficient generator 204 provides selected Haar coefficients, $X_l^{(q)}$, to inverse Haar transform logic 208 via bus 206. The inverse Haar transform logic 208 has an amplitude output 210.

Operationally, a forward Haar transform is performed by a separate device (not shown) on a smooth signal such as the sinusoidal waveform 224 shown in FIG. 2. Amplitude samples, $y_z$, of the sinusoidal waveform 224 are transformed by the separate device into a corresponding set of Haar spectral coefficients, $X_l^{(q)}$, which are subsequently stored or otherwise embedded in logic within the Haar coefficient generator 204. And because the Haar transform the data that describes smooth signals to be compressed, the amount of logic required to store and/or generate the Haar spectral coefficients is much less than that which would otherwise be required to store the amplitude samples, $y_z$, themselves. Hence, to recreate, or synthesize, the sinusoidal waveform 224, phase logic (not shown) provides a sequence of discrete phase values 222, z, into the phase input 202, as a function of a prescribed clock frequency. Each phase value, z, is used to index the Haar coefficient generator 204 such that a corresponding amplitude value, $y_z$, is provided at the output 210. Thus, for each z input to the Haar coefficient generator 204, a corresponding set of selected spectral coefficients are provided, namely, only those spectral coefficients that are required to compute the desired output amplitude sample, $y_z$. The inverse Haar transform logic 208 receives the selected spectral coefficients via the bus 206 and performs the inverse Haar transform to compute the output sample, $y_z$. Thus a synthesized sinusoidal waveform 224 is generated.

Synthesis of sinusoids 224 by digital logic in this manner is known in the art as digital frequency synthesis. An embodiment of the Haar transform for data compression in a digital frequency synthesis circuit is described in copending U.S. Patent Application entitled Apparatus and Method for Direct Digital Frequency Synthesis, docket SLD:002, referenced above.

That data compression advantages are realized for many types of smooth signals is significant because the number of bits in a logic circuit that are required to store a given data entity directly impacts the reliability, power consumption, and cost of that circuit. Less bits equates to less power, less complexity, and less cost: three attributes that drive the consumer electronics market. In particular, the amount of power used by a device becomes a very important design criteria when that device is to be operated using battery power. Such devices include cellular telephones, pagers, portable radios, portable digital assistants (PDAs), and portable computers. All of these portable electronic devices incorporate numerous digital frequency synthesis circuits. However, the benefits of improved data compression extend beyond the limits of digital frequency synthesis to encompass any device that employs one of the smooth waveforms alluded to above. One skilled in the art will appreciate that directly reducing the number of logic cells that are required to generate, or store, or transform information directly and beneficially influences the power consumption, complexity, and cost of an associated electronic product.

The above benefits notwithstanding, there remain several problems with the manner in which present day electronic products employ Haar transform techniques resulting in excessive numbers of logic cells being required to compute both forward and inverse transformation of signals. These problems are more specifically detailed with reference to FIG. 3.

Figure 3:
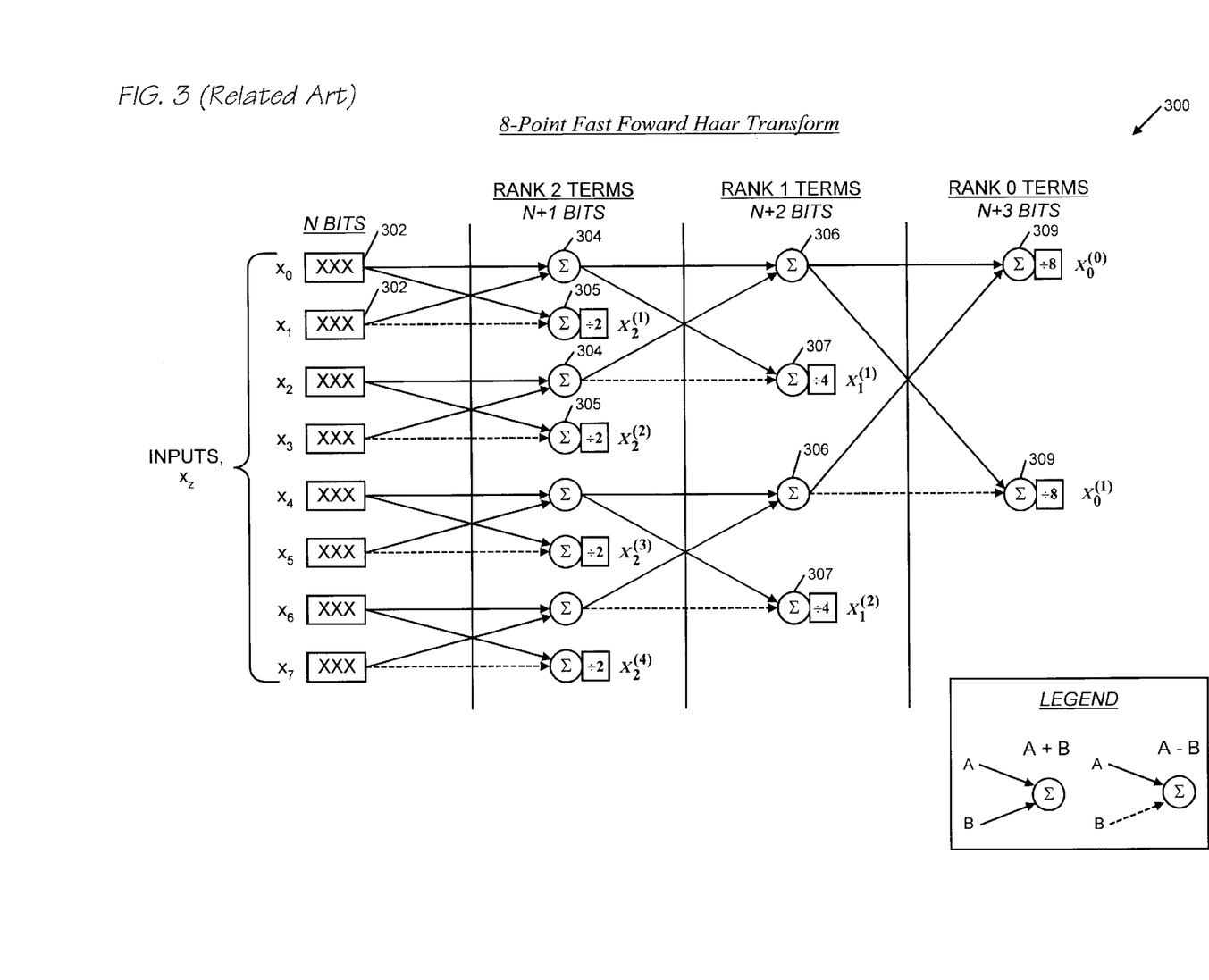
FIG. 3 is a block diagram illustrating present day forward Haar transform logic.

FIG. 3 is a block diagram illustrating present day forward Haar transform logic 300. The forward Haar transform logic 300 is representative of logic devices that are used either within an electronic product or within a separate device to produce a set of Haar spectral coefficients, $X_i^{(q)}$, corresponding to an input sequence, $x_z$. The forward Haar transform logic 300 consists of a number of data inputs 302, that provide indexed samples from the input sequence to a first rank, RANK 2, of intermediate term generators 304 and a first rank, RANK 2, of corresponding coefficient generation logic devices 305. The RANK 2 intermediate terms are provided to a second rank, RANK 1, of intermediate term generators 306 and a second rank, RANK 1, of corresponding coefficient generation logic devices 307. The RANK 1 intermediate terms are provided to a third rank, RANK 0, of coefficient generation devices 309. The forward aar transform logic 300 presented in FIG. 3 depicts the most prevalent technique employed in present day electronic devices for computing a forward Haar transform, the technique being known as a fast Haar transform. For illustration purposes, only an 8-point fast forward Haar transform (i.e., corresponding to an input sequence, $x_z$, having eight data samples) is depicted in FIG. 3, however, one skilled in the art will appreciate that present day fast forward Haar transform logic devices 300 typically operate on input sequences consisting of hundreds of samples. In addition, based upon the rank and indexing scheme for Haar spectral coefficients presented with reference to FIG. 1, it is evident that the fast Haar transform technique employs logic 304, 305 to compute the higher rank spectral coefficients prior to computing the lower rank coefficients.

In operation, the RANK 2 intermediate term generators 304 are employed to add two 3-bit indexed input samples 302 together. The RANK 2 coefficient generators 305 take the difference between two 3-bit indexed input samples 302 to form RANK 2 Haar spectral coefficients, $X_2^{(q)}$. Note that in accordance with the functions described above for computing Haar spectral coefficients, the differences taken within RANK 2 must first be divided by 2 in order to form the RANK spectral coefficients. Accordingly, the RANK 2 intermediate term generators 304 can be realized as 2-input adders. Likewise, the RANK 2 coefficient generators 305 can be realized as 2-input subtractors followed by divide-by-2 logic. But since the data samples 302 shown in this example are 3 bits wide, the 2-input intermediate term generators 304 must be capable of producing a 4-bit sum. Likewise, the RANK 2 coefficient generators must also be capable of producing a 4-bit difference. Thus, representation of the RANK 2 spectral coefficients, $X_2^{(q)}$, requires 4 bits.

The 4-bit RANK 2 intermediate terms are then provided to the RANK 1 intermediate term generators 306 and the RANK 1 coefficient generators 307. Consequently, the intermediate term generators 306 and coefficient generators 307 corresponding to RANK 1 must be capable of producing 5-bit sums and differences, respectively. In addition, the RANK 1 coefficient generators 307 must also be capable of dividing differences generated in RANK 1 by 4. Thus, representation of the RANK 1 spectral coefficients, $X_1^{(q)}$, requires 5 bits.

Finally, the 5-bit RANK 1 intermediate terms are provided to the RANK 0 coefficient generators 309. Accordingly, the coefficient generators 309 corresponding to RANK 0 must be capable of producing 6-bit differences. In addition, the RANK 1 coefficient generators 307 must also be capable of dividing the generated differences by 8. Thus, representation of the RANK 0 spectral coefficients, $X_0^{(q)}$, requires 6 bits.

As a practical matter in the design of a forward Haar transform circuit 300, circuit designers will set the size of all coefficient and intermediate term registers at least equal to the greatest number of bits that are required to represent either of these data entities. For the example described with reference to FIG. 4, all coefficient and intermediate term registers would most likely sized to accepts 6-bit terms. And while 6 bits is sufficient to represent the RANK 0 spectral coefficients, $X_0^{(q)}$, it is important to note that half of the total quantity of spectral coefficients-the RANK 2 coefficients, $X_2^{(q)}$-can be represented by only 4 bits.

To scale the example of FIG. 3 so that is represents practical present day electronic device, assume that the input sequence, $x_z$, consists of 256 10-bit data samples. It follows from the above discussion that the first rank-RANK 7 in this case-of intermediate terms and spectral coefficients corresponding to the 256-sample input sequence, would require 11-bit registers. Yet, because of the increased number of ranks, the RANK 0 spectral coefficients would require 18-bit registers. As a consequence, a designer would be forced to prescribe 18-bit registers to accommodate all spectral coefficients and intermediate terms for the 256-sample sequence. But note that 128 RANK 7 intermediate terms and 128 RANK 7 spectral coefficients in this example realistically only require 11-bit registers. As a result, roughly (18 bits–11 bits)×128×2=1,792 bit cells are wasted because they are not required to represent RANK 7 terms and coefficients.

To generalize current forward Haar transform practices, the maximum number of bits that are required to represent spectral coefficients corresponding to an M-member input sequence of N-bit data samples is $\log_2 M+N$. Yet, at least half of the spectral coefficients (i.e., the high-rank coefficients) and intermediate terms only require N+1 bits to represent. And while these circumstances may not viewed as insurmountable from the perspective of performing forward and inverse transforms on, say, a desktop computer, one skilled the art will appreciate that in the portable and hand-held product area, this is a very significant problem. Even in the case discussed with reference to FIG. 2, where the spectral coefficients are computed by a separate device, storage of many of the spectral coefficients and computation of the inverse transform still requires register sizes in excess of that required to represent samples of the input sequence.

The present invention eliminates the limitations of present day Haar transform techniques by providing an apparatus and method for computing intermediate terms and spectral coefficients corresponding to a compact Haar transform. Use of the compact Haar transform provides all of the real number, simple arithmetic computational benefits achievable with the fast Haar transform, yet the number of bits required to represent all of the intermediate terms and spectral coefficients corresponding to the compact Haar transform never require more than N+1 bits, where N is the umber of bits required to represent samples within an M-sample sequence. Only N+1 bits are required, regardless of the number of samples, M, within an input sequence. The present invention is more specifically described with reference to FIGS. 4 through 8.

Figure 4:
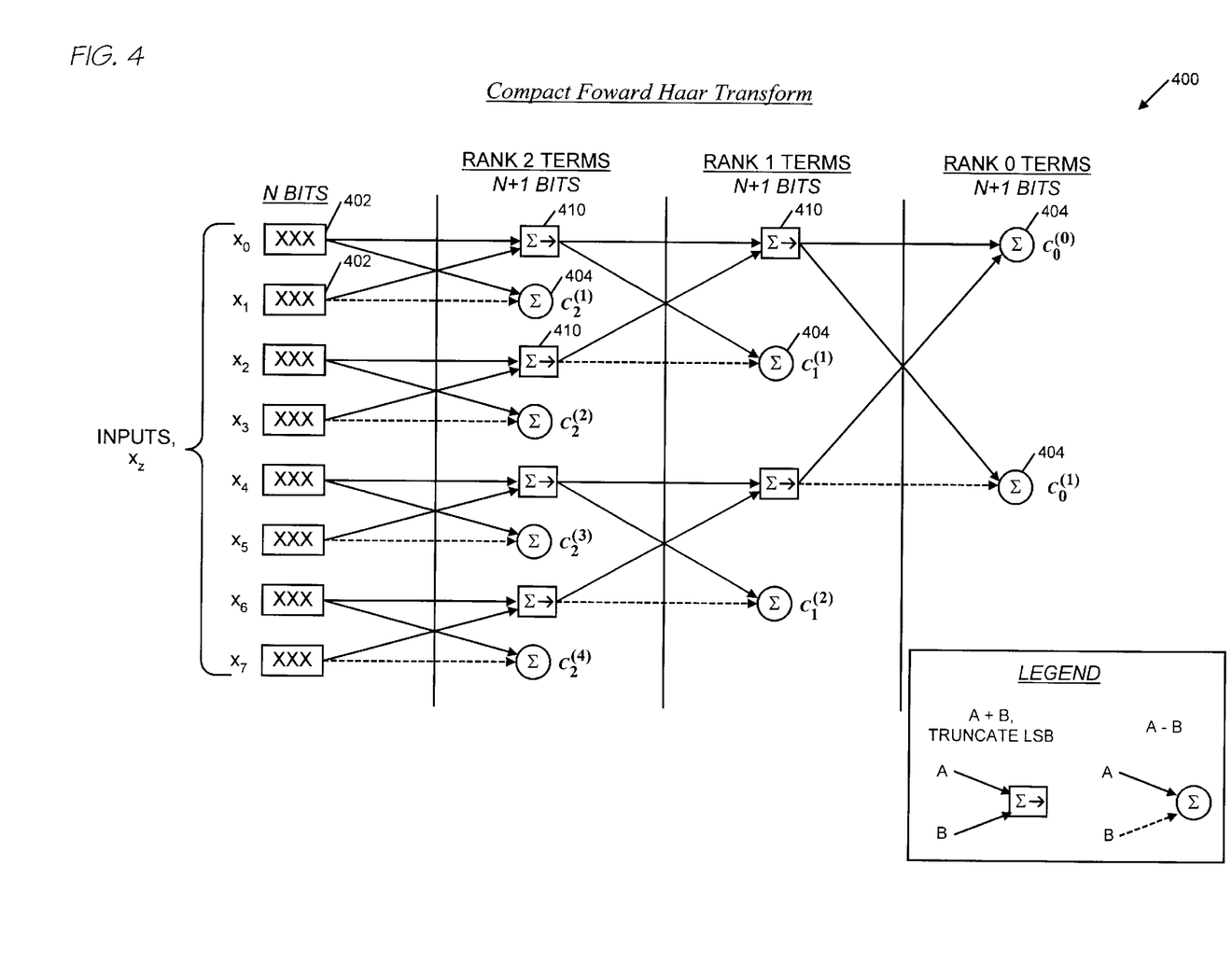
FIG. 4 is a block diagram depicting compact forward Haar transform logic according to the present invention.

Now referring to FIG. 4, a block diagram is presented depicting compact forward Haar transform logic 400 according to the present invention. The compact Haar transform logic 400 is depicts logic devices that are used either within an electronic product or within a separate device to produce a set of compact Haar spectral coefficients, $C_I^{(q)}$, corresponding to an input sequence, $x_z$. The compact forward Haar transform logic 400 consists of a number of data inputs 402, that provide indexed samples from the input sequence to a first rank, RANK 2, of compact intermediate term generators 410 and a first rank, RANK 2, of corresponding compact coefficient generation logic devices 404. The RANK 2 compact intermediate terms are provided to a second rank, RANK 1, of compact intermediate term generators 410 and a second rank, RANK 1, of corresponding compact coefficient generation logic devices 404. The RANK 1 compact intermediate terms are provided to a third rank, RANK 0, of compact coefficient generation devices 404. Like that discussed with reference to FIG. 3, for illustration purposes, only an 8-point fast forward Haar transform (i.e., corresponding to an input sequence, $x_z$, having eight data samples) is depicted in FIG. 4, however, one skilled in the art will appreciate that present day fast forward Haar transform logic devices 300 typically operate on input sequences consisting of hundreds, thousands, millions, or even billions of samples.

In contrast to the example discussed with reference to FIG. 3 for computing a fast forward Haar transform, the devices 404, 410 required for computation of the compact Haar transform are the same, regardless of which rank they are in. This is because the size of compact Haar intermediate terms and spectral coefficients does not grow with decreasing rank; the size of the terms and coefficients remains fixed.

Operationally, the RANK 2 compact intermediate term generators 410 are employed to add two 3-bit indexed input samples 302 together to produce a 4-bit intermediate sum. Following generation of the 4-bit intermediate sum, the least significant bit of the intermediate sum is truncated, thus producing a 3-bit compact intermediate term. Accordingly, the RANK 2 compact intermediate term generators 304 can be realized as 2-input adders capable of producing a 4-bit sum, while at the same time including logic to truncate the least significant bit of the sum to return the sum to a 3-bit number. In one embodiment, although the least significant bits of the two adder inputs are summed, no provision is made to store the sum, thus implicitly accomplishing the truncation during the addition.

The RANK 2 compact coefficient generators 404 take the difference between two 3-bit indexed input samples 402 to form RANK 2 compact Haar spectral coefficients, $C_2^{(q)}$. Note that in accordance with the functions described above for computing Haar spectral coefficients, the differences taken within RANK 2 should be divided by 2 in order to form the RANK 2 spectral coefficients. However, one embodiment of the present invention directly computes the differences in RANK 2 and postpones the division by two until the coefficients are used to compute an inverse transform. likewise, the RANK 2 coefficient generators 305 can be realized as 2-input subtractors capable of producing a 4-bit output. Thus, representation of the RANK 2 compact spectral coefficients, $C_2^{(q)}$, requires 4 bits.

The 4-bit RANK 2 compact intermediate terms are then provided to the RANK 1 compact intermediate term generators 410 and the RANK 1 compact coefficient generators 404. But since the RANK 2 compact intermediate terms are only 3-bits wide the intermediate term generators 410 and coefficient generators 404 corresponding to RANK 1 are the same size as those required to produce RANK 2 compact intermediate terms and compact coefficients. In addition, the RANK 1 compact coefficient generators 404 should also be capable of dividing differences generated in RANK 1 by 4. But explicit division of the differences formed in RANK 2 are not required because truncation of the least significant bits of the RANK 2 compact intermediate terms is in effect a division by 2. And hence, as with the RANK 2 compact Haar coefficients, the RANK 1 compact Haar coefficients are left being a multiple of 2 off from corresponding fast Haar coefficients. The scaling by two, in one embodiment, is accomplished when the coefficients are used to perform an inverse compact Haar transform. Thus, representation of the RANK 1 compact spectral coefficients, $C_1^{(q)}$, requires only 4 bits.

At this point a question arises as to the veracity of the compact spectral coefficients, $C_1^{(q)}$, computed in RANK 1 because they do not reflect the difference between two RANK 2 Haar intermediate terms, as were discussed with reference to FIGS. 1 and 3. This is true. One distinction that has already been addressed is that the compact coefficients are scaled by a factor of 2, which is subsequently dealt with during computation of the inverse compact Haar transform. But it is the second distinction between compact Haar spectral coefficients, $C_I^{(q)}$, and corresponding fast Haar spectral coefficients, $H_I^{(q)}$, that is significant. The intermediate terms generated using the compact Haar transform have their least significant bits truncated. As a result, computation of compact Haar spectral coefficients using these truncated terms do not reflect the forward Haar transform equations discussed above. This is true.

But the present inventor has observed that, as is shown in FIG. 4, for each compact intermediate term that is generated having a truncated least significant bit using the compact Haar transform, a corresponding difference is taken to produce a corresponding compact Haar spectral coefficient, $C_I^{(q)}$, whose least significant bit remains intact. And it is a mathematical fact that if the difference between two numbers is an even number, then the sum of those two numbers will be an even number. If the difference between two numbers is an odd number, then the sum of those two numbers will be an odd number. And realizing that digit positions in binary numbers only take on the values of 0 or 1, the present inventor has developed a technique for restoring the true state of the truncated least significant bits of each of the compact Haar intermediate terms by utilizing the least significant bits of their corresponding compact Haar coefficients. Restoral of the intermediate term states is vital when computing the inverse transform. But truncated compact intermediate terms and compact coefficients can be computed or stored according to the present invention using a register size that is only one bit larger than that required to represent input samples. All of the information critical to computation of an inverse Haar transform is preserved through use of the present invention, yet the benefit is that no extra logic cells are required; all compact Haar spectral coefficients are only one bit wider than the input samples.

Thus, 3-bit RANK 1 compact intermediate terms are provided to the RANK 0 coefficient generators 404. And like the compact spectral coefficients generated in RANK 2, representation of the RANK 0 spectral coefficients, $C_0^{(q)}$, requires only 4 bits.

To scale the example of FIG. 4 so that is represents a realistic electronic device, assume that the input sequence, $x_z$, consists of 256 10-bit data samples. It follows from the above discussion that the first rank-RANK 7 in this case-of compact intermediate terms and compact spectral coefficients corresponding to the 256-sample input sequence, would require 11-bit registers. Moreover, because all of the compact spectral coefficients generated via the present invention require the same number of bits for representation, the RANK 0 compact spectral coefficients also require 11-bit registers. As a result, a designer would be need only prescribe 11-bit registers to accommodate all compact spectral coefficients and compact intermediate terms for the 256-sample sequence. In contrast to the fast Haar transform example discussed with reference to FIG. 3, in RANK 7 alone use of the present invention results in a savings of 1,792 bit cells {i.e., (18 bits–11 bits)×128 ×2}.

To generalize the compact forward Haar transform, the maximum number of bits that are required to represent spectral coefficients corresponding to an M-member input sequence of N-bit data samples is N+1, regardless of the number of samples, M, in the sequence. One skilled the art will appreciate that such savings in logic cells in the portable and hand-held product area equates to reduced power and complexity, increased reliability, and reduced cost.

Figure 5:
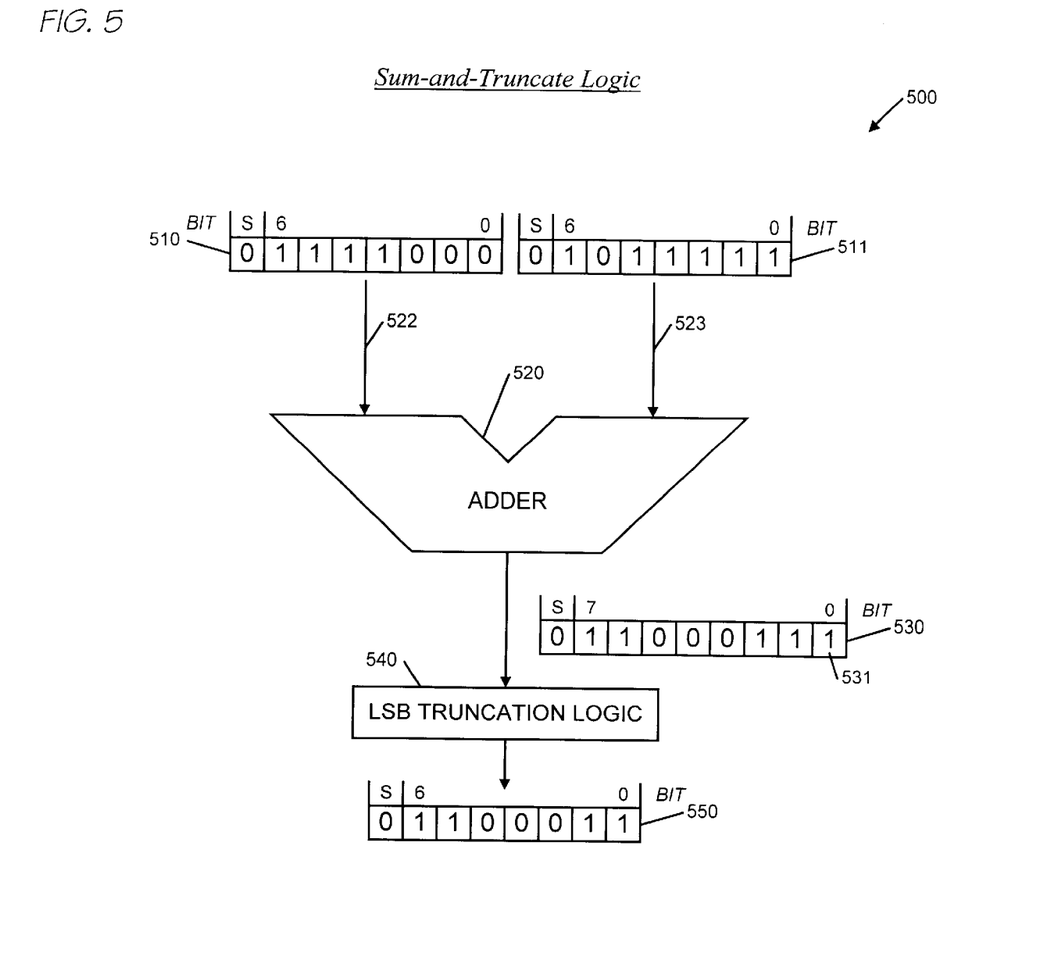
FIG. 5 is a block diagram illustrating details of sum-and-truncate logic according to the present invention.

Now referring to FIG. 5, a block diagram is shown illustrating details of sum-and-truncate logic 500 according to the present invention. In one embodiment, the sum-and-truncate logic 500 is used as a compact intermediate term generator in compact forward Haar transform logic according to the present invention. The sum-and-truncate logic has a 2-input adder 520 that receives two 8-bit signed inputs 510, 511 via buses 522 and 523. The 2-input adder 520 provides a 9-bit signed output 530 to least significant bit (LSB) truncation logic 540. The LSB truncation logic 540 provides an 8-bit signed output 550.

In operation the 2-input adder 520 generates a correct 9-bit signed sum 530 of the two 8-bit signed inputs 510, 511. The least significant bit 531 of the 9-bit signed sum 530 is truncated by the LSB truncation logic to generate an 8-bit signed number 550 consisting of the upper eight bits of the 9-bit signed sum 530.

In an alternative embodiment, the 2-input adder 520 only provides an eight bit output 550 consisting of the upper eight bits of the 9-bit signed sum, thus eliminating the requirement for LSB truncation logic 540.

Figure 6:
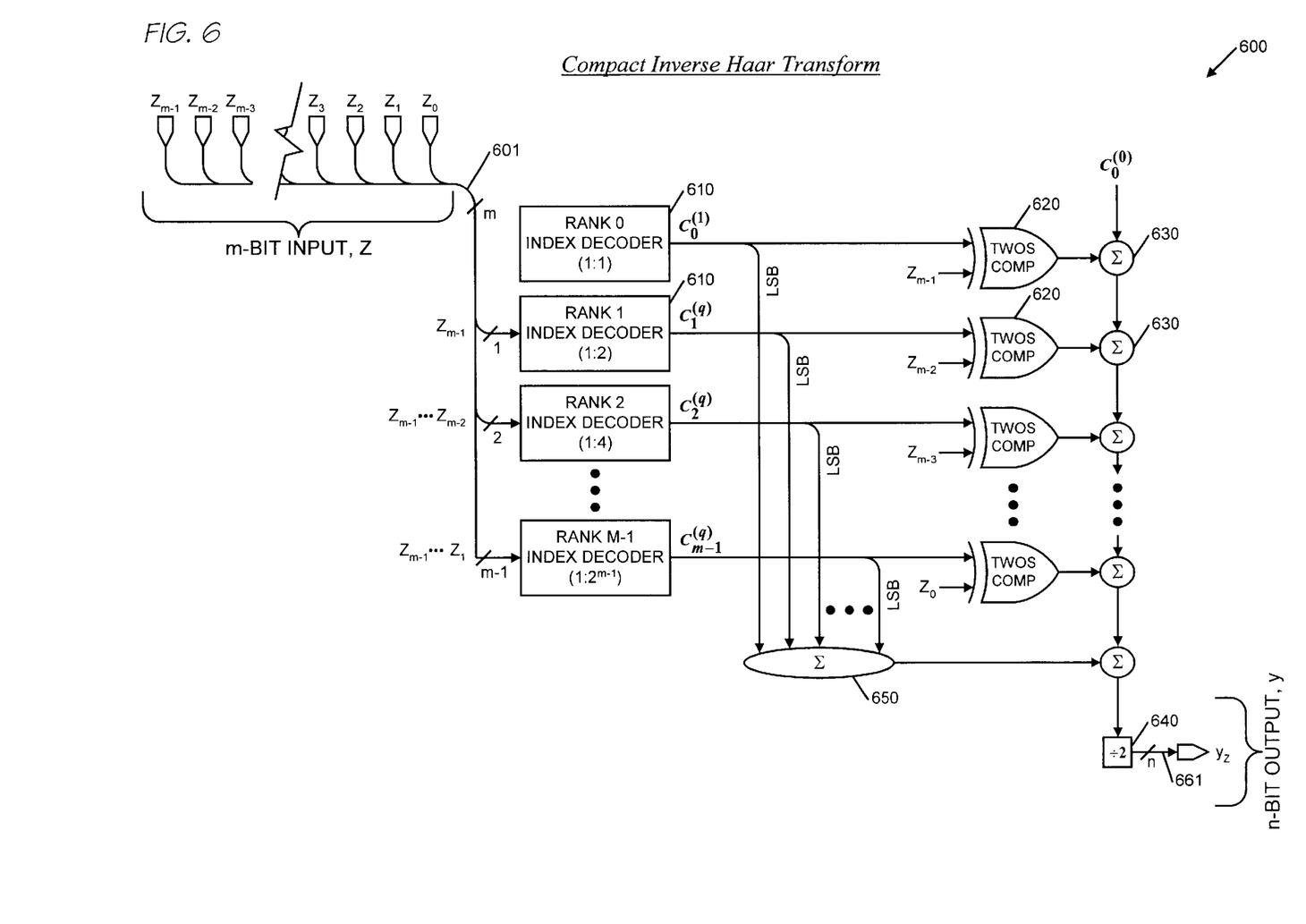
FIG. 6 is a block diagram depicting compact inverse Haar transform logic according to the present invention.

Now referring to FIG. 6, a block diagram is presented depicting compact inverse Haar transform logic 600 according to the present invention. The compact inverse Haar transform logic 600 has an m-bit input 601, Z, that provides selected bits to rank index decoders 610. Each of the rank index decoders provides a selected compact Haar spectral coefficient, $C_l^{(q)}$, to corresponding negation logic devices 620. Selected bits of the m-bit input 601 are also provided to the negation logic devices 620. Each of the negation logic devices 620 provide an output to 2-input adders 630 forming a sequential sum. The sequential sum is provided to divide-by-two logic 640, which provides an n-bit output 661, $y_z$. In addition, the least significant bits of each of the selected compact Haar spectral coefficients is provided to least significant bit restoral logic 650, whose output is provided to an adder 630 within the sequential sum chain.

Operationally, the compact inverse Haar transform logic receives an m-bit index 601, z, denoting an output 661, $y_z$, to be computed. In accordance with the inverse Haar transform equations discussed with reference to FIG. 1, computation of an indexed output 661, $y_z$, is achieved by summing together appropriate positive and negated Haar spectral coefficients. With the exception of RANK 0, only one coefficient is selected within each rank for computation of the sum. Selection of the coefficient is determined by the value of the index input 601. As is evident from the block diagram, spectral coefficient $C_0^{(0)}$ is always required to compute an output sample 661. In addition, $C_0^{(1)}$ is always required, however, whether $C_0^{(1)}$ is introduced into the running sum as a positive number or a negative number depends upon the value of the most significant bit, $z_{m-1}$, of the index input 601. If $z_{m-1}$ is a logical 0 then the negation logic 620 outputs positive $C_0^{(1)}$ to the adder 630. If $z_{m-1}$ is a logical 1, then the negation logic 620 outputs negative $C_0^{(1)}$ to the adder 630.

Likewise, for RANK 1, one of two compact spectral coefficients, $C_1^{(1)}$ or $C_1^{(2)}$, is required to compute the output sample 661. Selection of the RANK 1 spectral coefficient is based upon the value of the most significant bit, $z_{m-1}$, of the index 601. Whether the selected RANK 1 spectral coefficient is negated or not depends upon the state of $z_{m-2}$.

The rank index logic 610 for RANK 2 utilizes the two most significant bits, $z_{m-1}$ and $z_{m-2}$, of the index 601 to select one of the four RANK 2 spectral coefficients. The third most significant bit, $z_{m-3}$, of the index 601 determines whether the selected RANK 2 spectral coefficient is negated or not.

The last rank index decoder 610 utilizes all but bit 0 of the index 601 to select one of $2^{m-1}$ spectral coefficients to add into the running sum. The state of bit 0 of the index 601 determines the sign of the selected RANK M-1 coefficient. The correct value of the truncated compact intermediate terms used to compute the compact spectral coefficients are restored to that required to compute an inverse Haar transform according to the equations discussed above by introducing the least significant bits of each of the selected compact spectral coefficients into the sum to compute output samples 661. In one embodiment, this is accomplished by routing all least significant bits to the LSB restoral logic 650. One skilled in the art will appreciate that the least significant bits can also be introduced into each of the adders 630 in the running sum. In the embodiment shown in FIG. 6, LSB restoral logic 650 adds all of the least significant bits into the running sum while the negation logic 620 is embodied as an exclusive-OR gate capable of adding 1 to support twos compliment format.

As was alluded to in the discussion with reference to FIG. 4, all of the compact spectral coefficients are a factor of 2 off of that required to compute the inverse Haar transform. Hence, the divide-by-two logic 640 performs the required operation, resulting in generation of the desired output sample 661 that corresponds to the index 601.

In a alternative embodiment, the first L rank index decoders 610 along with their corresponding negation logic 620 and adders 630 is replaced with a read-only memory (ROM) containing corresponding pre-computed partial sums for the inverse transformation. The index 601 is used to select one of the pre-computed partial sum, which is then provided to the adder corresponding to RANK L+1.

The examples discussed with reference to FIGS. 4 through 6 clearly illustrate how an electronic product according to the present invention uses less power and is more reliable than products that employ fast Haar techniques. In addition, since the number of bits required to compute all intermediate terms and spectral coefficients is fixed, the same devices can be used to compute terms corresponding to all ranks of the Haar spectrum, thus providing economy-of-scale benefits as well.

Figure 7:
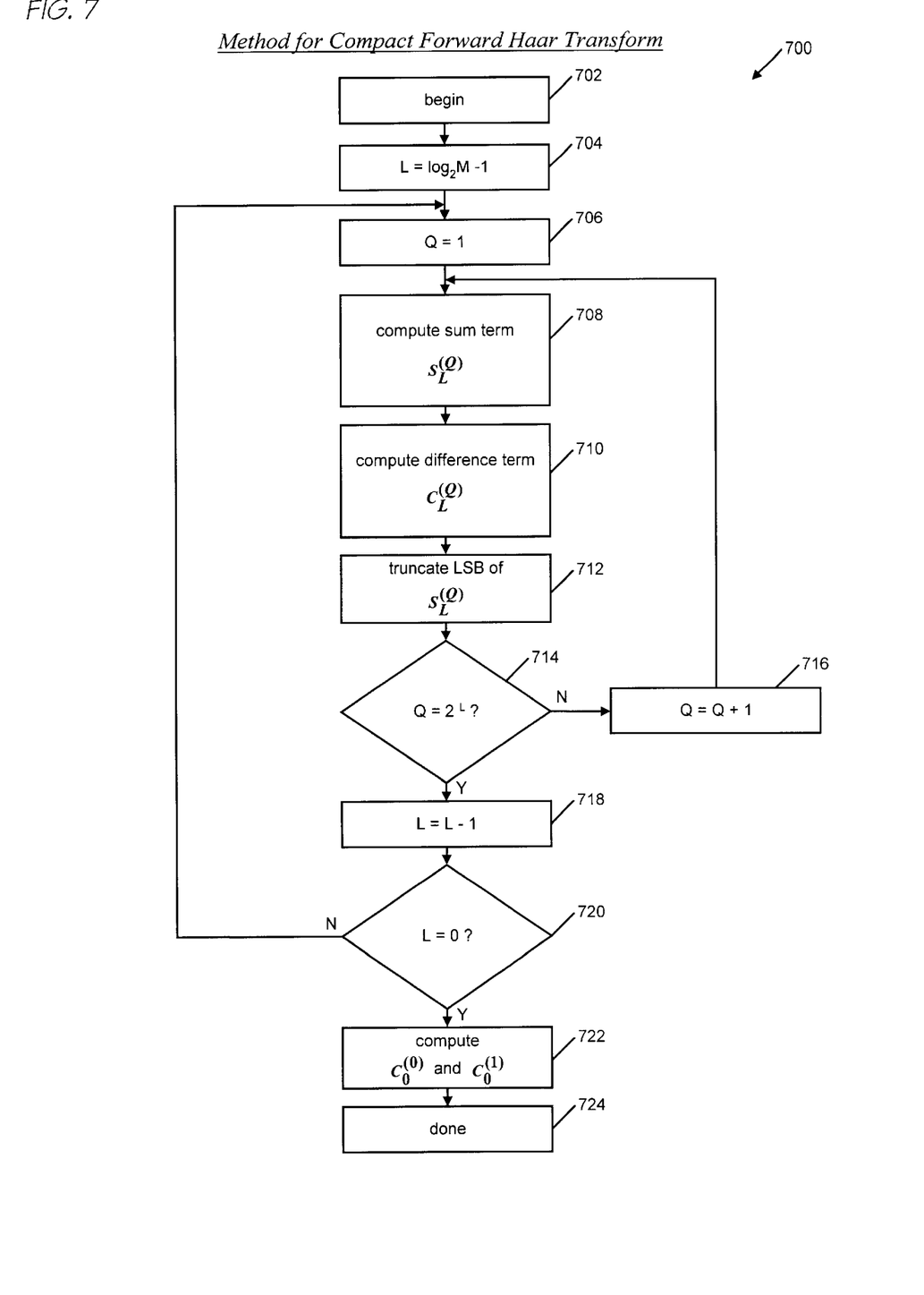
FIG. 7 is a flow chart depicting a method for generating a compact forward Haar transform according to the present invention.

Now referring to FIG. 7, a flow chart is presented depicting a method for generating a compact forward Haar transform according to the present invention.

The method begins at block 702 where a sequence of M n-5 bit data samples are provided for forward compact Haar transformation. Flow then proceeds to block 704.

At block 704, terms according to a first rank of the compact Haar spectrum are addressed by setting the rank, L, equal to $\log_2 M-1$. For a sequence consisting of 256 samples, the first rank computed would be RANK 7. Flow then proceeds to block 706.

At block 706, the index, Q, of a compact intermediate sum, $S_L^{(Q)}$, and a compact spectral coefficient, $C_L^{(Q)}$, to be computed for RANK L, is set to 1. Flow then proceeds to block 708.

At block 708, the compact intermediate sum term is computed from two terms indexed by L and Q. For the first rank of the compact Haar spectrum, the two indexed terms comprise input data samples. For all remaining ranks of the Haar spectrum, the two indexed terms comprise truncated sum terms from the next higher rank of the Haar spectrum. The compact sum is an n+1-bit number. Flow then proceeds to block 710.

At block 710, the compact coefficient term, a difference term, is computed from two terms indexed by L and Q. For the first rank of the compact Haar spectrum, the two indexed terms comprise input data samples. For all remaining ranks of the Haar spectrum, the two indexed terms comprise truncated sum terms from the next higher rank of the Haar spectrum. The compact coefficient is an n+1-bit number. Flow then proceeds to block 712.

At block 712, the least significant bit of the n+1-bit compact sum term is truncated to form an n-bit compact intermediate term. Flow then proceeds to decision block 714.

At decision block 714, the value of the index variable, Q, is evaluated to determine if it is equal to $2^L$, thus indicating that all of the intermediate terms and spectral coefficients have been computed for a given rank of the Haar spectrum. If not, then flow proceeds to block 716. If all of the terms and spectral coefficients have been calculated for the given rank, then flow proceeds to block 718.

At block 716, the index variable, Q, is incremented by one. Flow then proceeds to block 708 for calculation of the next term and coefficient within the given rank, L.

At block 718, the rank variable, L, is decremented by 1. Flow then proceeds to decision block 720.

At block 720, the value of the rank variable, L, is evaluated to determine if it is equal to 0, thus indicating that all terms and coefficients in the Haar spectrum for rank 1 and above have been computed. Note that no intermediate terms are computed for rank 0. If L is not equal to 0, then flow proceeds to block 706. If L points to rank 0, then flow proceeds to block 722.

At block 722, the two spectral coefficients corresponding to rank 0 of the Haar spectrum are computed. Flow then proceeds to block 724.

At block 724, the method completes. All spectral coefficients computed by the method illustrated in the flow chart 700 are at most n+1-bit numbers. All intermediate terms, because the least significant bit of their corresponding compact intermediate sum is truncated, are n-bit numbers.

Figure 8:
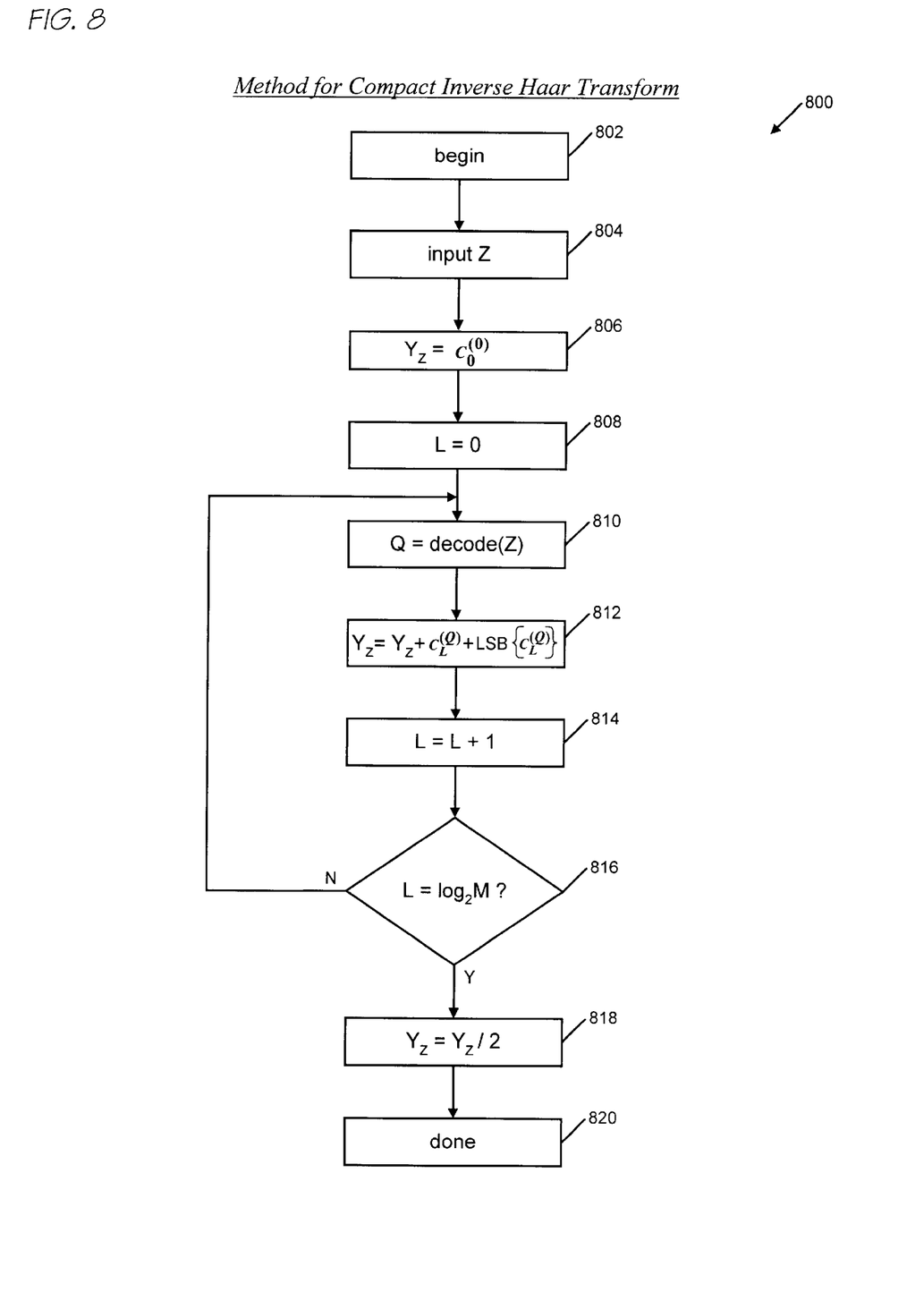
FIG. 8 is a flow chart depicting a method for generating a compact inverse Haar transform according to the present invention.

Now referring to FIG. 8, a flow chart 800 is presented depicting a method for generating a compact inverse Haar transform according to the present invention.

Flow begins at block 802 where an output sample index, Z, is selected to point to a specific output sample, $Y_z$, which is to be computed according to the compact inverse Haar transform. It is assumed that a forward compact Haar transform has been previously performed on M n-bit data samples according to the index. Execution of the forward compact Haar transform has produced M n+1-bit compact Haar spectral coefficients, $C_L^{(Q)}$, corresponding to an indexed sequence, Y. Flow then proceeds to block 804.

At block 804, the output sample index, Z, is provided to inverse compact Haar transform logic according to the present invention for computation of the indexed output sample, $Y_z$. Flow then proceeds to block 806.

At block 806, the output sample, $Y_z$, is set to the value of compact Haar spectral coefficient $C_0^{(0)}$ from rank 0 of the compact Haar spectrum. This coefficient is always required to compute any output sample, $Y_z$. The step performed within this block is the initiation of a running sum that is required to compute $Y_z$. Flow then proceeds to block 808.

At block 808, the value of a rank variable, L, is set to 0, thus pointing to rank 0 of the compact Haar spectrum. Flow then proceeds to block 810.

At block 810, a rank index variable, Q, is set by decoding the index, Z. For example, if the rank variable, L, is set to indicate rank 1 and the most significant bit of Z is set to zero, then Q is set to 1. If the most significant bit of Z is 1, then Q is set to 2. Decoding Z selects one coefficient within a given rank, the coefficient being required in the running sum to generate $Y_z$. Flow then proceeds to block 812.

At block 812, the running sum is iterated to produce a new value by adding the selected spectral coefficient along with the least significant bit of the selected spectral coefficient to the previous value of the running sum. Flow then proceeds to block 814.

At block 814, the pointer to the Haar spectral rank, L, is incremented. Flow then proceeds to decision block 816.

At decision block 816, the rank pointer, L, is evaluated to determine if it is equal to $\log_2 M$, thus indicating that all ranks of the compact Haar spectrum have been addressed in the running sum required to compute the output sample, $Y_z$. If not, then flow proceeds to block 810, where a coefficient from the next rank will be selected and incorporated into the running sum. If all ranks have been addressed, then flow proceeds to block 818.

At block 818, the running sum is divided by two to produce the indexed output sample, $Y_z$. This division is required because compact Haar spectral coefficients are a factor of two off of true Haar coefficients. Flow then proceeds to block 820.

At block 820, the method completes.

Although the present invention and its objects, features, and advantages have been described in detail, other embodiments are encompassed by the invention. For example, one skilled in the art will appreciate that the present invention described above may be embodied as computer instructions stored within a computer readable medium. Such an embodiment may be in the form of VHSIC Hardware Description Language (VHDL), Verilog, or a behavioral model such as RTL, stored on a hard disk, or other permanent medium that is readable by a computer. When executed, the instructions cause the computer to completely describe the logic devices according to the present invention such that forward or/and inverse compact Haar transform logic can be simulated, tested, modified, or fabricated, either as stand-alone circuits or as circuits incorporated into a more complex design.

In addition, aspects of the present invention have been particularly exemplified in terms of a performing an inverse transform to obtain an indexed data sample. This indexing technique is often used to digitally synthesize certain waveforms where the index corresponds to a phase value and the indexed output corresponds to an amplitude value. Certainly, the present invention is very useful for digital waveform synthesis applications. But the scope of the present invention encompasses a much broader range of applications as well. More specifically, the present invention can be utilized to perform an inverse Haar transform based upon parallel input of a complete set of Haar spectral coefficients such that a complete sequence of output samples is provided rather than a single indexed sample. This type of embodiment proves useful for real-time signal processing applications related to video and audio signals.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A compact Haar transform apparatus, for executing a spectral transformation corresponding to a sequence of n-bit samples, the compact Haar transform apparatus comprising:

sum-and-truncate logic, configured to generate a plurality of n-bit intermediate terms wherein said sum-and-truncate logic truncates the least significant bit of a generated n+1-bit sum to form an associated n-bit intermediate term; and a plurality of coefficient generators, coupled to said sum-and-truncate logic, configured to generate a plurality of n+1-bit spectral coefficients, wherein said associated n-bit intermediate term corresponds to one of said plurality of n+1-bit spectral coefficients, said one of said plurality of n+1-bit spectral coefficients indicating whether said generated n+1-bit sum was even or odd, and wherein said generated n+1-bit sum is restored by adding the least significant bit of said one of said plurality of n+1-bit spectral coefficients to said associated n-bit intermediate term.

2. The compact Haar transform apparatus as recited in claim 1, wherein pairs of the n-bit samples are summed to produce a first rank of said plurality of n-bit intermediate terms.

3. The compact Haar transform apparatus as recited in claim 2, wherein pairs of said first rank of said plurality of n-bit intermediate terms are summed to produce a second rank of said plurality of n-bit intermediate terms.

4. The compact Haar transform apparatus as recited in claim 3, wherein a first rank of said plurality of the n+1-bit spectral coefficients is derived by taking differences between pairs of the n-bit samples.

5. The compact Haar transform apparatus as recited in claim 4, wherein a second rank of said plurality of n+1-bit spectral coefficients is derived by taking differences between pairs of said first rank of said plurality of n-bit intermediate terms.

6. The compact Haar transform apparatus as recited in claim 1, wherein said sum-and-truncate logic comprises a plurality of n+1-bit adders.

7. The compact Haar transform apparatus as recited in claim 1, wherein said plurality of coefficient generators comprises a plurality of n+1-bit subtractors.

8. The compact Haar transform apparatus as recited in claim 1, further comprising:

inverse transform logic, coupled to said plurality of spectral coefficient generators, configured to reproduce the sequence of n-bit samples, wherein each of the n-bit samples is derived from particular n+1-bit spectral coefficients, said particular n+1-bit spectral coefficients being selected based upon an n-bit sample index.

9. The compact Haar transform apparatus as recited in claim 8, wherein said inverse transform logic comprises:

a rank decoder, configured to receive said n-bit sample index, and to provide one of said particular n+1-bit spectral coefficients, said one of said particular n+1-bit spectral coefficients corresponding to a rank of the spectral transformation;

a coefficient negator, coupled to said rank decoder, configured to negate said one of said particular n+1-bit spectral coefficients based upon the state of a bit of said n-bit sample index; and LSB restoral logic, coupled to said rank decoder, configured to add a least significant bit of said one of said particular n+1-bit spectral coefficients into an n-bit sample computation.

10. An apparatus for executing a compact Haar transform, comprising:

an index signal, for indicating a specific n-bit sample, said specific n-bit sample being one of a sequence of n-bit samples corresponding to the compact Haar transform; and inverse transform logic, coupled to said index signal, for computing said specific n-bit sample, wherein said specific n-bit sample is derived from selected n+1-bit spectral coefficients, said inverse transform logic comprising:

a rank decoder, for decoding said index signal to provide one of said selected n+1-bit spectral coefficients, said one of said selected n+1-bit spectral coefficients corresponding to a compact Haar spectral rank, wherein said rank decoder comprises a read only memory (ROM);

coefficient negation logic, coupled to said rank decoder, for negating said one of said selected n+l-bit spectral coefficients based upon the state of a bit of said index signal, wherein the state of said bit of said index signal indicates whether a Haar basis function corresponding to said one of said selected n+1-bit spectral coefficients is positive or negative; and LSB restoral logic, coupled to said rank decoder, for adding a least significant bit of said one of said selected n+1-bit spectral coefficients into an n-bit sample computation, said n-bit sample computation being required to compute said n-bit sample.

11. The apparatus as recited in claim 10, wherein said ROM comprises memory locations, each of said memory location having a width in bits that corresponds to the number of bits required to represent an associated n+1-bit spectral coefficient.

12. The apparatus as recited in claim 10, further comprising: forward transform logic, for generating said selected n+1-bit spectral coefficients from said sequence of n-bit samples.

13. The apparatus as recited in claim 12, wherein said forward transform logic comprises:

a plurality of coefficient generators, for computing said selected n+1-bit spectral coefficients; and sum-and-truncate logic, coupled to said coefficient generators, for computing n-bit intermediate terms.

14. The apparatus as recited in claim 13, wherein said sum-and-truncate logic truncates the least significant bit of a particular n+1-bit intermediate sum to form a particular n-bit intermediate term.

15. The apparatus as recited in claim 14, wherein said particular n-bit intermediate term corresponds to a particular n+1-bit spectral coefficient, said particular n+1-bit spectral coefficient indicating whether said particular n+1-bit intermediate sum is even or odd.

16. The apparatus as recited in claim wherein said n+1-bit intermediate sum is restored in an inverse transformation by said LSB restoral logic.

17. The apparatus as recited in claim 16, wherein said sum-and-truncate logic comprises an n+1-bit adder.

18. The apparatus as recited in claim 17, wherein said plurality of coefficient generators comprises a plurality of n+1-bit subtractors.

19. A computer program product for use in designing, simulating, fabricating, or testing a compact Haar transform circuit, the computer program product comprising:

a storage medium, having computer readable instructions embodied thereon, for causing a computer upon which said computer readable instructions are executed to describe the compact Haar transform circuit, said computer readable instructions comprising:

first instructions, for causing said computer to describe inverse Haar transform logic, said inverse Haar transform logic being configured to compute n-bit samples, wherein each of said n-bit samples is derived from n+1-bit spectral coefficients, wherein said inverse transform logic comprises:

a rank decoder, for receiving an index signal from a source thereof, and for providing one of said n+1-bit spectral coefficients, said one of said n+1-bit spectral coefficients corresponding to a rank of a compact Haar spectrum;

a coefficient negator, coupled to said rank decoder, for negating said one of said n+1-bit spectral coefficients based upon the state of a bit of said index signal; and LSB restoral logic, coupled to said rank decoder, for adding a least significant bit of said one of said n+1-bit spectral coefficients into an n-bit sample computation, said n-bit sample computation being required to generate a particular n-bit sample.

20. A method for executing an inverse compact Haar transform, comprising:

decoding an index to select n+1-bit spectral coefficients, the n+1-bit spectral coefficients being required to compute a specific n-bit data sample;

negating those n+1-bit spectral coefficients whose corresponding Haar basis function is negative for the index provided by said decoding;

computing a sum of the negated n+1-bit spectral coefficients with the selected n+1-bit spectral coefficients which are not negated by said negating; and adding the least significant bits of all of the selected n+1-bit spectral coefficients to the sum produced by said computing.

21. The method as recited in claim 20, further comprising:

dividing the result of said adding by 2 to generate the specific n-bit data sample.

22. The method as recited in claim 21, further comprising:

altering the value of the index to indicate a next n-bit data sample; and repeating said decoding, said negating, said computing, said adding, said dividing, and said altering until all n-bit data samples within an original sequence are computed.

* * * * *